(12) United States Patent
Meixner

(10) Patent No.: US 6,359,082 B1
(45) Date of Patent: Mar. 19, 2002

(54) PROCESS FOR THE PREPARATION OF EPOXY (METH) ACRYLATES REACTING EPOXY COMPOUNDS WITH ANHYDRIDE AND OH-FUNCTIONAL (METH)ACRYLIC-POLYETHERPOLYOL

(75) Inventor: Jürgen Meixner, Krefeld (DE)

(73) Assignee: Bayer Aktiengesellschaft, Leverkusen (DE)

( * ) Notice: Subject to any disclaimer, the term of this patent is extended or adjusted under 35 U.S.C. 154(b) by 468 days.

(21) Appl. No.: 08/878,159

(22) Filed: Jun. 18, 1997

(30) Foreign Application Priority Data

Jun. 25, 1996 (DE) .......................................... 196 25 266

(51) Int. Cl.$^7$ ............................................... C08G 59/17
(52) U.S. Cl. ...................... 525/531; 525/449; 525/451; 525/532; 525/922
(58) Field of Search ................................ 525/438, 449, 525/450, 451, 531, 532, 922

(56) References Cited

U.S. PATENT DOCUMENTS

| 4,014,771 A | 3/1977 | Rosenkranz et al. ... 204/159.23 |
| 4,081,492 A | 3/1978 | Traenchkner et al. ... 260/837 R |
| 4,253,918 A | 3/1981 | Traenchkner et al. .. 204/159.22 |
| 4,690,987 A | 9/1987 | Sakakibara et al. ......... 525/502 |

FOREIGN PATENT DOCUMENTS

| CA | 2097022 | 11/1993 |
| DE | 4109048 | 9/1992 |

OTHER PUBLICATIONS

Lee et al–Handbook of Epoxy Resins, McGraw Hill, pp. 5–20 to 5–26, 1982.*

* cited by examiner

Primary Examiner—Robert E. L. Sellers
(74) Attorney, Agent, or Firm—Joseph C. Gil; Thomas W. Roy; Diderico van Eyl

(57) ABSTRACT

The present invention relates to a process for the preparation of epoxy(meth)acrylates by simultaneously reacting 1 equivalent of organic compounds containing epoxide groups with A) 0.8 to 1.2 moles of organic dicarboxylic anhydrides having a molecular weight from 98 to 166 and B) 0.8 to 1.2 OH equivalents of OH group-containing reaction products, which are prepared at a COOH/OH equivalent ratio of 0.6:1 to 0.95:1, of
a) (meth)acrylic acid and
b) tri- or tetrahydric ether alcohols having a molecular weight of 180 to 1000 and containing at least two ethylene and/or propylene oxide units as part of an ether structure.

1 Claim, No Drawings

PROCESS FOR THE PREPARATION OF EPOXY (METH) ACRYLATES REACTING EPOXY COMPOUNDS WITH ANHYDRIDE AND OH-FUNCTIONAL (METH)ACRYLIC-POLYETHERPOLYOL

BACKGROUND OF THE INVENTION

1. Field of the Invention

The present invention relates to a process for the preparation of epoxy(meth)acrylates which may be used as free radical curing binders for coating compositions, caulks and sealants and for the preparation of molded articles.

2. Description of the Prior Art

Epoxy(meth)acrylates, which are prepared by reaction of an epoxy resin, e.g., bisphenol-A-diglycidylether, with (meth)acrylic acid in the presence of catalysts are described, e.g., in DE-A 2,349,979. The epoxy(meth)acrylates are normally highly viscous substances, which are dissolved in low molecular weight monomers, such as hexane diol diacrylate, before undergoing further processing.

Modified epoxy(meth)acrylates have previously been prepared, e.g., by reaction with amines (DE-A 2,429,527) or dicarboxylic acids (DE-A 4,217,761), or by the reaction of the OH groups, which are produced during the addition of (meth)acrylic acid onto the epoxide group, with acid anhydrides (DE-A 4,109,048) or isocyanates (DE-A 3,519,117).

SUMMARY OF THE INVENTION

The present invention relates to a process for the preparation of epoxy(meth)acrylates by simultaneously reacting 1 equivalent of organic compounds containing epoxide groups with A) 0.8 to 1.2 moles of organic dicarboxylic anhydrides having a molecular weight from 98 to 166 and B) 0.8 to 1.2 OH equivalents of OH group-containing reaction products, which are prepared at a COOH/OH equivalent ratio of 0.6:1 to 0.95:1, of
  a) (meth)acrylic acid and
  b) tri- or tetrahydric ether alcohols having a number average molecular weight of 180 to 1000 and containing at least two ethylene and/or propylene oxide units as part of an ether structure.

DETAILED DESCRIPTION OF THE INVENTION

It could not have been predicted that it would be possible to react polyepoxides with dicarboxylic anhydrides and OH compounds to form epoxy(meth)acrylates, since polyepoxides are known to react with dicarboxylic anhydrides while undergoing cross-linking with one another. This reaction is utilized, e.g., for the preparation of molded articles.

Within the context of the present invention, "compounds having epoxide groups" mean organic compounds which have a number average molecular weight ($M_n$) of 130 to 1000 and contain an average of at least one, preferably 1.5 to 6 and more preferably 1.5 to 2 epoxide groups per molecule. An "epoxide equivalent" means the amount of epoxide compounds in grams that contains one mole of epoxide groups.

Preferred compounds having epoxide groups are those having an epoxide equivalent weight of 100 to 500. Examples include polyglycidylethers of polyhydric phenols such as pyrocatechol, resorcinol, hydroquinone, 4,4'-dihydroxydiphenylmethane, 2,2-bis-(4-hydroxyphenyl)-propane (bisphenol A), 4,4'dihydroxydiphenylcyclohexane, 4,4'-dihydroxy-diphenylsulphone, tris-(4-hydroxyphenyl)-methane and novolaks (i.e., reaction products of mono- or polyhydric phenols with aldehydes, particularly formaldehyde, in the presence of acid catalysts). Polyglycidyl ethers of bisphenol A are preferred.

Also suitable are glycidyl ethers of monoalcohols such as n-butanol or 2-ethylhexanol; glycidyl ethers of polyhydric alcohols such as butane 1,4-diol, butene 1,4-diol, hexane 1,6-diol, glycerol, trimethylolpropane, pentaerythritol and polyethylene glycols; triglycidyl isocyanurate; polyglycidyl thioethers of polyhydric thiols such as bismercaptomethyl-benzene; glycidyl esters of monocarboxylic acids such as versatic acid; and glycidyl esters of polyvalent, aromatic, aliphatic and cycloaliphatic carboxylic acids such as phthalic acid diglycidyl ester, isophthalic acid diglycidyl ester, terephthalic acid diglycidyl ester, tetrahydrophthalic acid diglycidyl ester, adipic acid diglycidyl ester and hexahydrophthalic acid diglycidyl ester.

Dicarboxylic anhydrides A) are selected from saturated, aromatic or unsaturated (cyclo)aliphatic dicarboxylic anhydrides having 4 to 9 carbon atoms such as the anhydrides of maleic acid, succinic acid, phthalic acid, tetrahydrophthalic acid, hexahydrophthalic acid or norbornene dicarboxylic acid.

Component B) is selected from OH group-containing reaction products (meth)acrylic acid with tri- or tetrahydric ether alcohols having a number average molecular weight (determined by end group analysis) of 180 to 1000 and containing at least two ethylene and/or propylene oxide units as part of an ether structure. These reaction products are prepared at a COOH/OH equivalent ratio of 0.6:1 to 0.95:1, preferably 0.65:1 to 0.90:1. The ether alcohols are obtained by the alkoxylation of suitable starter molecules in known manner. Preferred starter molecules are ether group-free tri- or tetrahydric alcohols, which correspond to the ether alcohols. Examples include glycerol, trimethylolpropane, trimethylolethane, pentaerythritol and mixtures thereof. The ether alcohols preferably have a degree of alkoxylation of 2 to 20, more preferably 2 to 15. The degree of alkoxylation refers to the average number of moles of ethylene oxide and/or propylene oxide which have been added onto 1 mole of an alcohol used as starter molecule.

The reaction between the components a) and b) takes place according to known methods, e.g., by azeotropic esterification of (meth)acrylic acid with the ether alcohols.

The reaction of the epoxides with compounds A) and B) takes place in one step, for example, according to the processes of DE-OS 2,429,527 and DE-A 2,534,012 (which correspond to U.S. Pat. Nos. 4,253,198 and 4,081,492, respectively, both of which are herein incorporated by reference), optionally in the presence of solvent. Suitable solvents include inert solvents such as butyl acetate, toluene, cyclohexane and mixtures thereof, and also copolymerizable monomers such as those described below. Preferably, no solvents or monomers are used.

The reaction is generally carried out in the presence of about 0.01 to 3 wt. %, based on the epoxide, of catalysts such as tertiary amines, quaternary ammonium salts, alkali hydroxides, alkali salts of organic carboxylic acids, mercaptans, dialkyl sulphides, sulphonium or phosphonium compounds and phosphines. The use of quaternary ammonium salts such as triethylbenzylammonium chloride is particularly preferred. The reaction takes place at 20 to 120° C., preferably 40 to 90° C.

The epoxy(meth)acrylates may optionally be modified with basic nitrogen compounds in a amount sufficient to provide up to 0.3 NH equivalents per epoxide equivalent. The modification reaction may be carried out before or after the epoxide reaction with components A) and B). Suitable basic nitrogen compounds include ammonia, (cyclo) aliphatic primary or secondary mono- or polyamines, preferably having a molecular weight of 31 to 300.

Examples of primary amines include mono- and diamines such as methylamine, n-butylamine, n-hexylamine, 2-ethylhexylamine, cyclohexylamine, ethanolamine, benzylamine, ethylene diamine, the isomeric diaminobutanes, the isomeric diaminohexanes and 1,4-diaminocyclohexane.

Examples of secondary amines include dimethylamine, diethylamine, diethanolamine, diisopropanolamine, N-methylethanolamine and N-cyclohexylisopropylamine.

The reaction of the epoxide groups with the nitrogen compounds may optionally take place in the presence solvents such as those previously set forth. The reaction is preferably carried out in the absence of solvent. The reaction temperature is 20 to 120° C., preferably 40 to 90° C.

The quantities of starting compounds are chosen such that, the reaction leads to essentially complete conversion of the epoxide groups originally present.

In order to protect the polymerizable reaction products according to the invention from unwanted premature polymerization, it is advisable to add, during the preparation process, 0.001 to 0.2 wt. %, based on the total reaction mixture including auxiliaries and additives, of polymerization inhibitors or antioxidants, such as phenols and phenol derivatives, preferably sterically hindered phenols. Other suitable stabilizers are described in "Methodender organischen Chemie" (Houben-Weyl), 4th edition, vol. XIV/1, page 433–452, 756, Georg Thieme Verlag, Stuttgart, 1961, and include 2,6-di-tert.-butyl-p.-cresol, hydroquinone monomethylether and/or phenothiazine.

The reaction products according to the invention may optionally be used in combination with copolymerizable monomers or solvents. Suitable copolymerizable monomers include di- and polyacrylates and di- and polymethacrylates of glycols having 2 to 6 carbon atoms and polyols having 3 to 4 hydroxyl groups and 3 to 6 carbon atoms. Examples include ethylene glycol diacrylate, propane 1,3-diol diacrylate, butane 1,4-diol diacrylate, hexane 1,6-diol diacrylate, trimethylolpropane triacrylate, pentaerythritol tri- and tetraacrylate, and the corresponding methacrylates. Also suitable are di(meth)acrylates of polyether glycols of initiated with ethylene glycol, propane 1,3-diol, butane 1,4-diol; triacrylates of the reaction products of 1 mole of trimethylolpropane with 2.5 to 5 moles of ethylene oxide and/or propylene oxide; and tri- and tetraacrylates of the reaction products of 1 mole of pentaerythritol with 3 to 6 moles of ethylene oxide and/or propylene oxide. Other copolymerizable monomers include aromatic vinyl compounds such as styrene; vinyl alkyl ethers such as vinylbutyl ether or triethylene glycol divinyl ether; and allyl compounds such as triallylisocyanurate.

Solvents, such as acetone, ethyl methyl ketone or cyclohexanone, may also be used as diluents during or after the reaction.

The products according to the invention or their mixtures with other copolymerizable monomers are valuable systems that can be cured with high-energy radiation, such as UV light, electron beams or gamma rays. Curing may also take place in the presence of compounds that generate free radicals such as (hydro)peroxides, optionally in the presence of accelerators.

Preferably, the reaction products according to the invention are used in compositions, preferably coating compositions that can be cured by UV light. These compositions may also be cured in very short times in the presence of atmospheric oxygen. The addition of photoinitiators is required in this case.

Suitable photoinitiatiors are known and include those described, for example, in "Methoden der organischen Chemie" (Houben-Weyl), Volume E 20, page 80 ff, Georg Thieme Verlag, Stuttgart 1987. Preferred examples include benzoin ethers such as benzoin isopropylether; benzil ketals such as benzil dimethylketal; hydroxyalkylphenones, such as e.g. 1-phenyl-2-hydroxy-2-methylpropan-1-one; and benzophenone and derivatives thereof.

The amount of the photoinitiators depends upon the purpose of the products according to the invention, but is generally an amount of 0.1 to 10 wt. %, preferably 0.1 to 5 wt. %, based on the weight of the reaction products according to the invention and the copolymerizable monomers. The photoinitiators may be used individually or in combination to obtain advantageous synergistic effects.

Preferably, the products according to the invention are used as a binder component for coating compositions for coating various substrates such as paper, cardboard, leather, wood, plastics, non-wovens, textiles, ceramic materials, paper provided with a photographic layer, and as a binder for molding compositions. Also, the products according to the invention may be used as binders for caulks and sealants, which are known and can be cured by radicals.

The invention is further illustrated but is not intended to be limited by the following examples in which all parts and percentages are by weight unless otherwise specified.

EXAMPLES

Component B) containing OH groups

The quantities of raw materials set forth in Table 1 together with 1.5% of p-toluenesulphonic acid, 0.3% of p-methoxyphenol and 0.02% of 2,5-di-tert.-butylhydroquinone, based on the weight of a) and b), were dissolved to form a 70% solution in cyclohexane, and heated to the reflux temperature while stirring and passing air through. The mixture was kept under a strong reflux until an acid number of less than 5 mg KOH/g of solids was obtained. After the mixture had cooled to 50° C., a vacuum was applied and the cyclohexane was distilled. The references to 3-, 4- and 12-fold relate to the degree of alkoxylation.

TABLE 1

|  | Component B) | | |
| --- | --- | --- | --- |
| Starting materials (moles) | B1 | B2 | B3 |
| Component a) | | | |
| Acrylic acid | 2.0 | 2.6 | 2.6 |
| Component b) | | | |
| 12-fold ethoxylated trimethylolpropane | 1.0 | | |
| 4-fold ethoxylated trimethylolpropane | | 1.0 | |
| 3-fold propoxylated trimethylolpropane | | | 1.0 |
| Acid number (mg KOH/g solids) | 4.5 | 4.5 | 3.5 |
| Viscosity (mPa.s/23° C.) acc. to DIN 53019/1 | 180 | 140 | 145 |

Examples 1 to 4

The quantities of polyepoxide, component A) and component B) set forth in Table 2 and also 0.1% of di-tert.- butyl-p.-cresol and 0.5% of triethylbenzylammonium chloride were heated to 80° C. while stirring and passing air through. The mixture was kept at that temperature until an acid number of <5 mg KOH/g solids was obtained.

TABLE 2

| Starting materials | Examples | | | |
|---|---|---|---|---|
| | 1 | 2 | 3 | 4 |
| Component A (moles) | | | | |
| Maleic anhydride | 1.0 | | 1.0 | 1.0 |
| Phthalic anhydride | | 1.0 | | |
| Component B (equiv) | | | | |
| B1 | 1.0 | | | |
| B2 | | 1.0 | 1.0 | |
| B3 | | | | 1.0 |
| Epoxide (equiv) | | | | |
| Bisphenol A-diglycidyl-ether (epoxide equiv wt: 190) | 1.0 | 1.0 | 1.0 | 1.0 |
| Viscosity (mPa.s/23° C.) acc. to DIN 53019/1 | 50,100 | 14,200 | 11,500 | 19,700 |

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for the preparation of an epoxy(meth)acrylate by simultaneously reacting 1 equivalent of one or more organic compounds containing epoxide groups with A) 0.8 to 1.2 moles of one or more organic dicarboxylic anhydrides having a molecular weight from 98 to 166 and B) 0.8 to 1.2 OH equivalents of one or more OH group-containing reaction products, which are prepared at a COOH/OH equivalent ratio of 0.6:1 to 0.95:1, of
   a) (meth)acrylic acid and
   b) one or more tri- or tetrahydric ether alcohols having a molecular weight of 180 to 1000 and containing at least two ethylene and/or propylene oxide units as part of an ether structure.

* * * * *